Figure 1A:
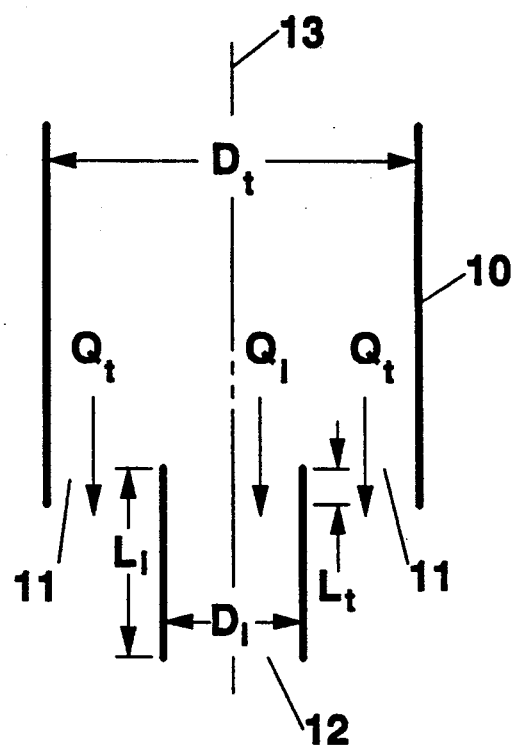

United States Patent [19]

Rakow

[11] Patent Number: 5,076,943

[45] Date of Patent: Dec. 31, 1991

[54] FLUID PARTICLE SEPARATOR WITH PRESSURE DROP RESISTANCE MATCHING

[76] Inventor: Allen L. Rakow, 2224 Wakefield Dr., Ft. Collins, Colo. 80526

[21] Appl. No.: 322,406

[22] Filed: Mar. 13, 1989

Related U.S. Application Data

[63] Continuation-in-part of Ser. No. 649,190, Sep. 10, 1984, abandoned.

[51] Int. Cl.$^5$ .............................................. B01D 21/00
[52] U.S. Cl. .................................... 210/808; 210/511; 209/155
[58] Field of Search ........................... 73/55; 137/171; 210/511, 767, 789, 808; 435/261; 209/1, 155

[56] References Cited

U.S. PATENT DOCUMENTS

| | | | |
|---|---|---|---|
| 3,523,406 | 8/1970 | Chenoweth et al. | 210/767 |
| 3,938,369 | 2/1976 | Debok | 73/55 |
| 4,414,106 | 11/1983 | Romanauskas | 209/155 |
| 4,519,239 | 5/1985 | Kiesewetter et al. | 73/55 |
| 4,707,276 | 11/1987 | Dodge et al. | 210/789 |
| 4,725,364 | 2/1988 | Hurley et al. | 210/767 |
| 4,789,482 | 12/1988 | Dileo et al. | 210/808 |

FOREIGN PATENT DOCUMENTS 808915  2/1981  U.S.S.R. .................................. 73/55

OTHER PUBLICATIONS

"Plasma Skimming in Human Blood Flowing Through Branching Glass Capillary Channels", A. A. Palmer, Proceedings of the 4th International Conference of Rheology (1965), Wiley Interscience.

"Axial Migration of Spirulina Microalgae in Laminar Flow", A. L. Rakow and M. L. Chappell, Biorheology 24, pp. 763-768 (1987).

"Behavior of Macroscopic Rigid Spheres in Poiseville Flow, Part II," G. Segre and A. Silberberg, Journal of Fluid Mech. 14, pp. 136-157 (1962).

"Axial Migration of Particles in Potseville Flow", A. Karnis, H. L. Goldsmith, S. G. Mason, Nature, 200, pp. 159-160 (1963).

"Some Model Experiments in Hemodynamics, IV," by H. L. Goldsmith and S. G. Mason, Proceed. of 2nd International Conf. of Hemorheology, Springer Verlag (1971).

Primary Examiner—Robert A. Dawson
Assistant Examiner—Joseph Drodge
Attorney, Agent, or Firm—Milton D. Wyrick

[57] ABSTRACT

A fluid particle separator comprises a tube having an output end open to atmospheric pressure for transporting axially migrated particles suspended in a carrier fluid. A physical barrier, such as a smaller diameter tube axially inserted near the output end of the tube, and resistance matched to the tube, allows separation of the axially migrated particles from the carrier fluid by being designed so that the pressure drop from its inlet to its outlet is substantially equal to the pressure drop in the remainder of the tube from the barrier to the tube output end.

6 Claims, 4 Drawing Sheets

FLUID PARTICLE SEPARATOR WITH PRESSURE DROP RESISTANCE MATCHING

This application is a continuation in part of that certain application, Ser. No. 649.190, filed Sept. 10, 1984, now abandoned.

This invention relates to the field of segregating the components contained within a fluid flow, and, more specifically to apparatus for concentrating liquid suspensions of fine particulates into an axial migration, allowing separation of the particulates by a physical barrier.

Many methods have been utilized by which particles are separated from fluids. Among these methods have been filtration, centrifugation, sedimentation, free-flow electrophoresis, flocculation, magnetic separation, and microstraining. However, with the majority of existing methods, the cost of recovering significant quantities of particulate is inordinately high.

It is well known that particulates migrate across streamlines of a suspension in Poiseuille flow, Poiseuille flow being a laminar flow of a Newtonian liquid in a tube. It has been established that neutrally buoyant spheres exhibit a tubular pinch effect, which is the parabolic velocity profile leading to migration to a fixed radial position in the laminar flow of suspensions in tubes. Segre, et al., J. Fluid Mech., 14, pp 136-157 (1962). Although the possibility of using the phenomenon in the fractionation of mixtures has been suggested, no one has taught how this can be practically accomplished.

It has been previously shown that the tubular pinch effect is also exhibited by nonspherical particles such as rods and disks, and that both hardened and normal red blood cells exhibit the effect at various velocities. At some velocities, the normal red cells migrate toward the center of the flow volume. Branching configurations have been used to study these red blood cell effects. However, most configurations resulted in technical difficulties such as flow control.

All of this work was directed toward the study of axial migration of particulates in a fluid flow. However, no work has shown how to practically take advantage of this axial migration. The ability to collect particles by making use of this axial migration is important in many fields, such as in biochemical processing and biochemical research.

It is an object of the present invention to provide for separation of fine particulates from fluid flows.

It is a still further object of the present invention to provide a method and apparatus for separating fine particulates from a fluid suspension without significant damage to the particulates.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities, and combinations particularly pointed out in the appended claims.

SUMMARY OF THE INVENTION

To achieve the foregoing and other objects, and in accordance with the purposes of the present invention, as embodied and broadly described herein, apparatus for separating and recovering particulates from a fluid flow may comprise tube means for transporting axially migrated particles suspended in a carrier fluid and having an output end open to atmospheric pressure. Physical barrier means resistance matched to the tube means and disposed axially near the output end of the tube means separate the particles in suspension from the carrier fluid.

In a further aspect of the present invention, and in accordance with its objects and purposes, a method of separating and recovering particulates from a fluid flow comprises the steps of creating a flow of carrier fluid containing axially migrated suspended particulates in a tube having an output end open to atmospheric pressure, and separating the axially migrated suspended particulates from the carrier fluid by use of a physical barrier resistance matched to the tube.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a cross-sectional view of the tubular insert embodiment of the present invention with a top view at A and an end view at B.

FIG. 2 is a cross-sectional view of the branch system embodiment of the present invention.

FIG. 3 is a top view at A and an end view at B of the conical annulus embodiment of the present invention.

FIG. 4 is cross-sectional top view at A and an end view at B of the parallel disk embodiment of the present invention.

DETAILED DESCRIPTION

The present invention involves the use of physical barriers inserted into flow streams to retrieve desired particulates from the flow. Referring first to FIG. 1, there can be seen a cross-section of tubular insert 12 inserted into an end of tube 10. It is assumed that tube 10 is of sufficient length to allow for creation of axial migration within the carrier or suspending fluid (not shown) so that the particulates (not shown) in tube 10 will be flowing near the axis of tube 10. This type insert, or physical barrier will be henceforth called resistance matching, because the inserts are designed so that the pressure drop from the inlet to the outlet of insert 12 is substantially equal to the pressure drop from the inlet to the outlet of annular channel 11 outside insert 12. As will be seen, this is the principle of all the embodiments described herein, that the pressure drops from the inlets to the outlets of each path through each of the physical barriers will be substantially equal. It should be understood that in all of the embodiments disclosed herein both the carrier fluid and the desired particulates exit directly to atmospheric pressure.

To accomplish resistance matching for the insert embodiment, it is assumed that the wall thickness of insert 12 is negligibly small; that the Newtonian viscosity of the flowing suspension in tube 10 is uniform; and that entrance disturbances are negligible. This assures that the flow near axis 13 is directed into insert 12, and the flow distant from axis 13 is directed into annular space 11. If the flow near axis 13 contains the particulates of interest because of axial migration, the particulates will be collected through insert 12. In other cases, where the particulates are not near axis 13, but are closer to wall 10, annular space 11 will contain the particulates. In general, non-spherical particles migrate closer to axis 13, while more spherical particles migrate to radial positions closer to wall 10.

Figure 1B:
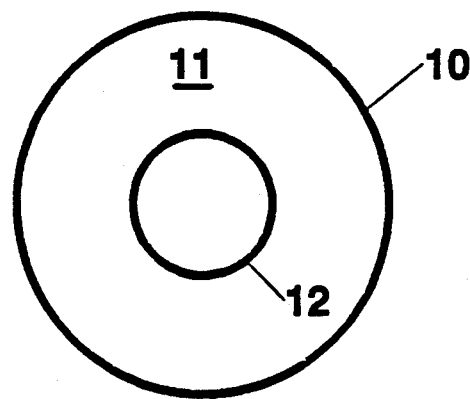

As shown in FIG. 1, the diameter of tube 10 is denoted as $D_t$, the diameter of insert 12 is denoted as $D_i$, the volumetric flow rate in insert 12 is $Q_i$, and the volumetric flow rate in annular channel 11 is $Q_t$. These volumetric flow rates can be expressed by the following equations:

$$Q_i=\pi \text{delta p } (D_i/2)^4/8\ \mu L_i$$

where delta p=incremental pressure change, $\mu$=viscosity of the suspension and $L_i$=length of insert 12; and $$Q_t=\pi \text{delta p } (D_t/2)^4[(1-k^4)-(1-k^2)^2/\ln(1/k)]/8\ \mu L_t$$

where $k=D_i/D_t$, and $L_t$=length of tube 10 from the beginning of insert 12 to the outlet end of annular space 11.

These flow rates can also be expressed in integral form for the approaching parabolic profile as follows:

$$Q_i=C_1\ \text{INT}_0^{r_i}\ v_z r\ dr$$

and $$Q_t=C_1\ \text{INT}_{r_i}^{r_t}\ v_z r\ dr$$

where $v_z=C_2[1-(r/r_t)^2]$, r=radial position, $r_i=D_i/2$, $r_t=D_t/2$, and $C_1$, $C_2$=constants.

Resistance matching allows the calculation of ratios for $L_i/L_t$ and $Q_t/Q_i$ for particular values of k through substitution, integration and equating the pressure drops with the above equations.

Figure 2:
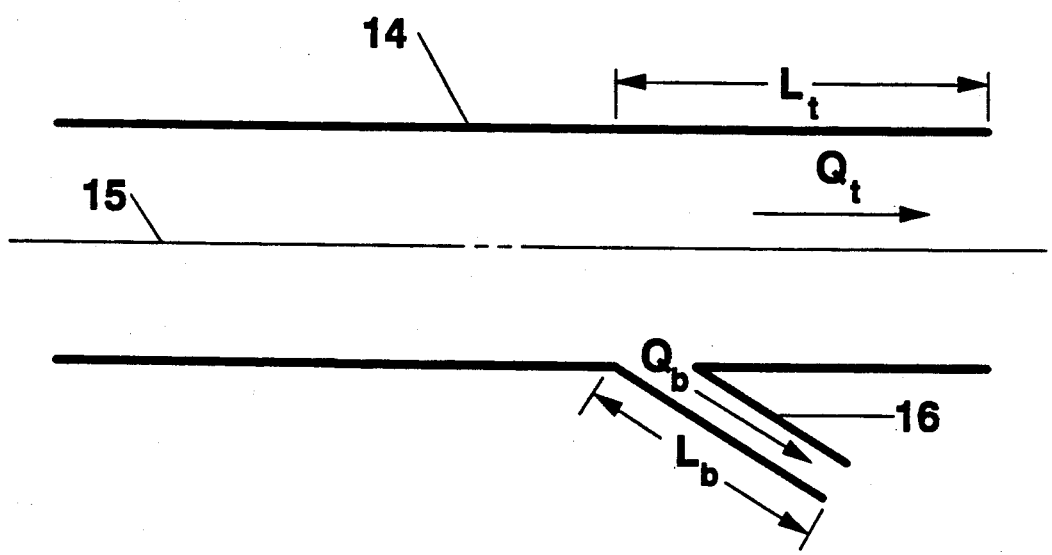
Figure 3A:
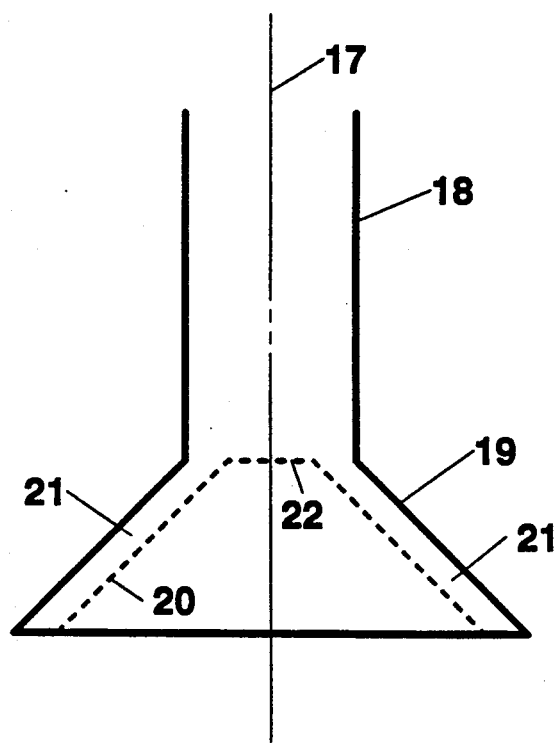
Figure 3B:
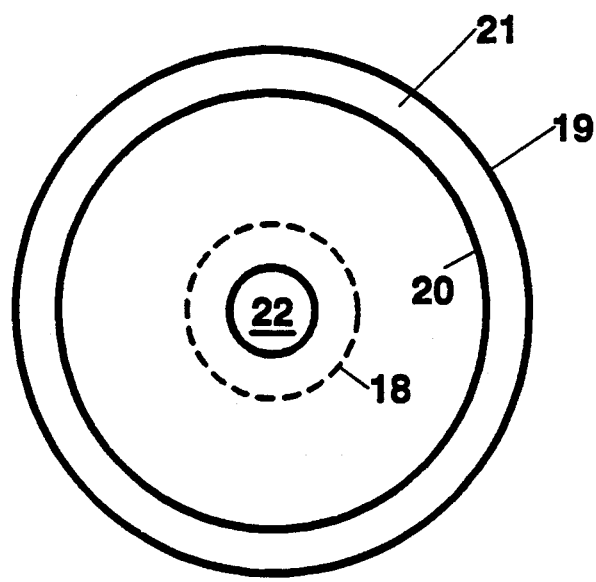
Figure 4A:
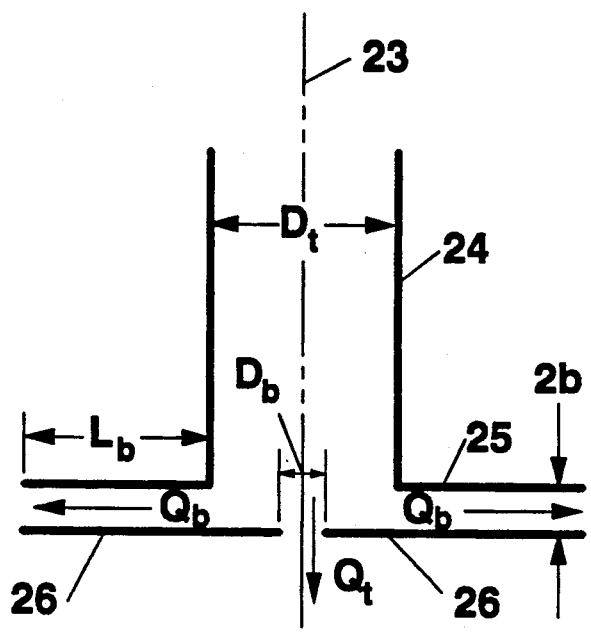
Figure 4B:
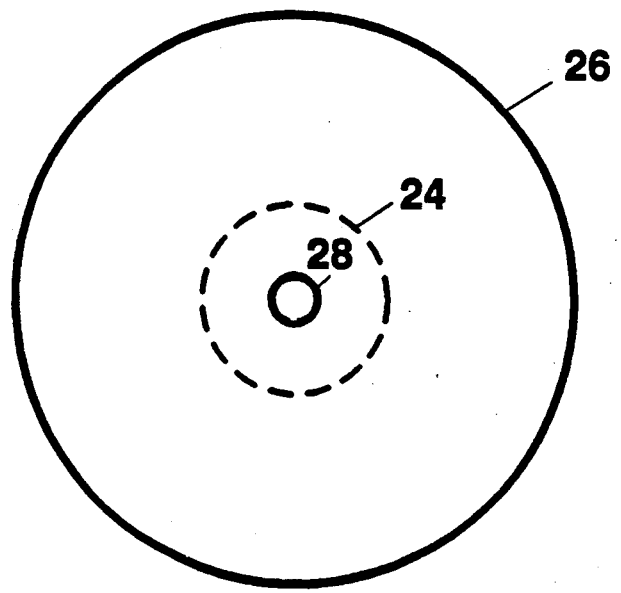

Another embodiment of the present invention is illustrated in FIG. 2, and is generally referred to as a branched system. As shown simply, tube 14 has branch 16 exiting from it, the physical barrier in this embodiment. Resistance matching in this case sets the pressure drop through tube 14 from the inlet of branch 16 to the outlet of tube 14 (length Lt) equal to the pressure drop through branch 16 (length Lb). In this configuration, if the desired particulates are near axis 15, they would continue past branch 16 to be collected, while the carrier solution would be evacuated through branch 16. Of course, for particulates which migrate to positions away from axis 15, this situation would be reversed, and the particulates would be collected through branch 16. If desired for a particular application, additional branches 16 could exit tube 14. The same provisions for resistance matching would apply for a plurality of branches 16.

The same equations for the approaching parabolic profile apply to this embodiment as were developed for the tubular insert case. The matching equations for the separation for the branched system case are:

$$Q_t=\pi \text{delta p } (D_t/2)^4/8\ \mu L_t$$

and $$Q_b=\pi \text{delta p } (D_b/2)^4/8\ \mu L_b$$

where $D_t$=diameter of tube 14, $L_t$=length of tube 14 from its inlet to branch 16, $D_b$=diameter of branch 16. $L_b$=length of branch 16, and delta p=pressure drop across branch 16 as well as across tube 14 from the inlet of branch 16 to the outlet of tube 14.

For a given va of k, as before, the ratio of $Q_t/Q_b$ can be calculated. By setting $L_t$ and again equating pressure drops (delta p), the relationship between $D_b$ and $L_b$ is determined. Thus by choosing a particular value of $L_b$, $D_b$ can be calculated, and the dimensions would be fully specified.

Still another embodiment can be seen by reference to FIG. 3. In this embodiment, called the conical annulus embodiment, tube 18 terminates in a flared portion 19. Inside flared portion 19 and spaced apart therefrom is parallel conical annulus 20, which has the shape of a truncated cone, the opening being central aperture 22, and the space between being annular space 21. Resistance matching in this case requires that the pressure drop through aperture 22 to its outlet will be equal to the pressure drop through annular space 21 from inlet to outlet.

In this embodiment, if the desired particulates are near axis 17 of tube 18 because of axial migration, they will pass through aperture 22 and be collected. The carrier solution is diverted through annular space 21 between flared portion 19 and conical annulus 20. Again, if the desired particulates are located away from axis 17, they will be collected from annular space 21, and the carrier solution would be collected through aperture 22.

A similar embodiment is illustrated in FIG. 4 wherein there is shown the parallel disk embodiment. In this embodiment, tube 24 terminates in disk 25. Parallel to disk 25, and spaced therefrom a distance 2*b*, is parallel disk 26 with axial aperture 28, the physical barrier in this embodiment. Resistance matching in this case requires that the pressure drop through aperture 28 be equal to the pressure drop through the space between disks 25, 26. The flow equations for $Q_t$ and $Q_b$ are given by equations 40 and 45:

$$Q_t = C_d\pi(D_b/2)^2\sqrt{2\rho\text{delta } p/1-(D_b/D_t)^2}\ /\rho,$$

and $$Q_b=4\pi(b)^3 \text{ delta } p/3\ \mu\ln(2L_b/D_b)$$

where $D_b$=diameter of aperture 28, $D_t$=diameter of tube 24, $C_d$=the orifice coefficient, and $\rho$=density of the fluid, 2*b*=width of the space between parallel disks 25, 26.

In this embodiment, if the desired particulates have migrated to a radial position near axis 23 of tube 24, they are collected through aperture 28, and the carrier fluid is diverted away through the space between disk 25 and parallel disk 26. Again, however, if the particulates have migrated to a radial position away from axis 23, they will be collected from the space between disks 25, 26, and the carrier fluid will be collected through aperture 28.

The foregoing description of embodiments of the present invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fluid particle separator comprising:
   tube means for transporting axially migrated particles suspended in a carrier fluid and having an output end open to atmospheric pressure;
   physical barrier means resistance matched to said tube means and disposed axially near said output end of said tube means for separating said axially migrated particles from said carrier fluid.

2. The separator as described in claim 1, wherein said physical barrier means comprises a second tube axially inserted into said output end of said first tube means.

3. The separator as described in claim 1, wherein said physical barrier means comprises one or more branch tubes exiting from said tube means.

4. The separator as described in claim 1, wherein said output end of said tube means is flared and said physical barrier means comprises a truncated cone spaced apart from and parallel to said flared end of said tube means.

5. The separator means as described in claim 1, wherein said output end of said tube means comprises a first circular disk and said physical barrier means comprises a second circular disk spaced apart from and parallel to said first circular disk and having an axial aperture.

6. A method of separating particles in suspension from a carrier fluid comprising:
   creating a flow of carrier fluid containing axially migrated suspended particulates in a tube having an output end open to atmospheric pressure;
   separating said axially migrated suspended particulates from said carrier fluid by use of a physical barrier resistance matched to said tube.

* * * * *